United States Patent [19]

Sattazahn et al.

[11] Patent Number: 4,582,200
[45] Date of Patent: Apr. 15, 1986

[54] DEVICE FOR MEASURING THE OFFSET BETWEEN THE FACEPLATE PANEL AND FUNNEL OF A KINESCOPE

[75] Inventors: Clarence W. Sattazahn, Akron, Pa.; Kenneth J. Diaz, Carolina

[73] Assignee: RCA Corporation, Princeton, N.J.

[21] Appl. No.: 600,379

[22] Filed: Apr. 16, 1984

[51] Int. Cl.⁴ .............................. B07C 5/02
[52] U.S. Cl. .................. 209/3.3; 33/178 D; 209/598; 209/604; 269/908
[58] Field of Search .................. 209/3.1–3.3, 209/509, 552, 598, 600, 604; 33/172 E, 178 D, 558, 561; 269/908; 445/3, 45

[56] References Cited

U.S. PATENT DOCUMENTS

| | | | |
|---|---|---|---|
| 2,514,878 | 7/1950 | Kuperus | 445/3 X |
| 2,587,774 | 3/1952 | Shack et al. | 33/143 R |
| 2,854,757 | 10/1958 | Roeger | 33/172 E X |
| 3,274,693 | 9/1966 | Witzke | 33/178 D X |
| 3,305,932 | 2/1967 | Iselin | 33/178 D |
| 3,311,233 | 3/1967 | Helmbrecht et al. | 209/3.3 X |
| 3,329,422 | 7/1967 | Hajduk | 445/45 |
| 3,343,081 | 9/1967 | Lane | |
| 3,807,006 | 4/1974 | Segro et al. | 445/45 X |
| 3,942,253 | 3/1976 | Gebel et al. | 33/178 D |
| 3,962,765 | 6/1976 | Stachel et al. | 445/45 X |
| 4,200,274 | 4/1980 | Turner | 269/319 |

FOREIGN PATENT DOCUMENTS 58-54536 3/1983 Japan .

Primary Examiner—Robert B. Reeves
Assistant Examiner—Edward M. Wacyra
Attorney, Agent, or Firm—E. M. Whitacre; L. L. Hallacher; T. H. Magee

[57] ABSTRACT

A device for measuring the offset between the funnel and panel of a kinescope includes a pivotable member which engages the reference pads on the funnel. The pivotable member is mounted on a slidable mount which is biased to an extended position. When the reference pads are engaged, the mount slides whereby all kinescope sizes can be measured. The pivotable member supports a gage which measures the offset and provides a reject signal when the offset exceeds a predetermined amount.

10 Claims, 3 Drawing Figures

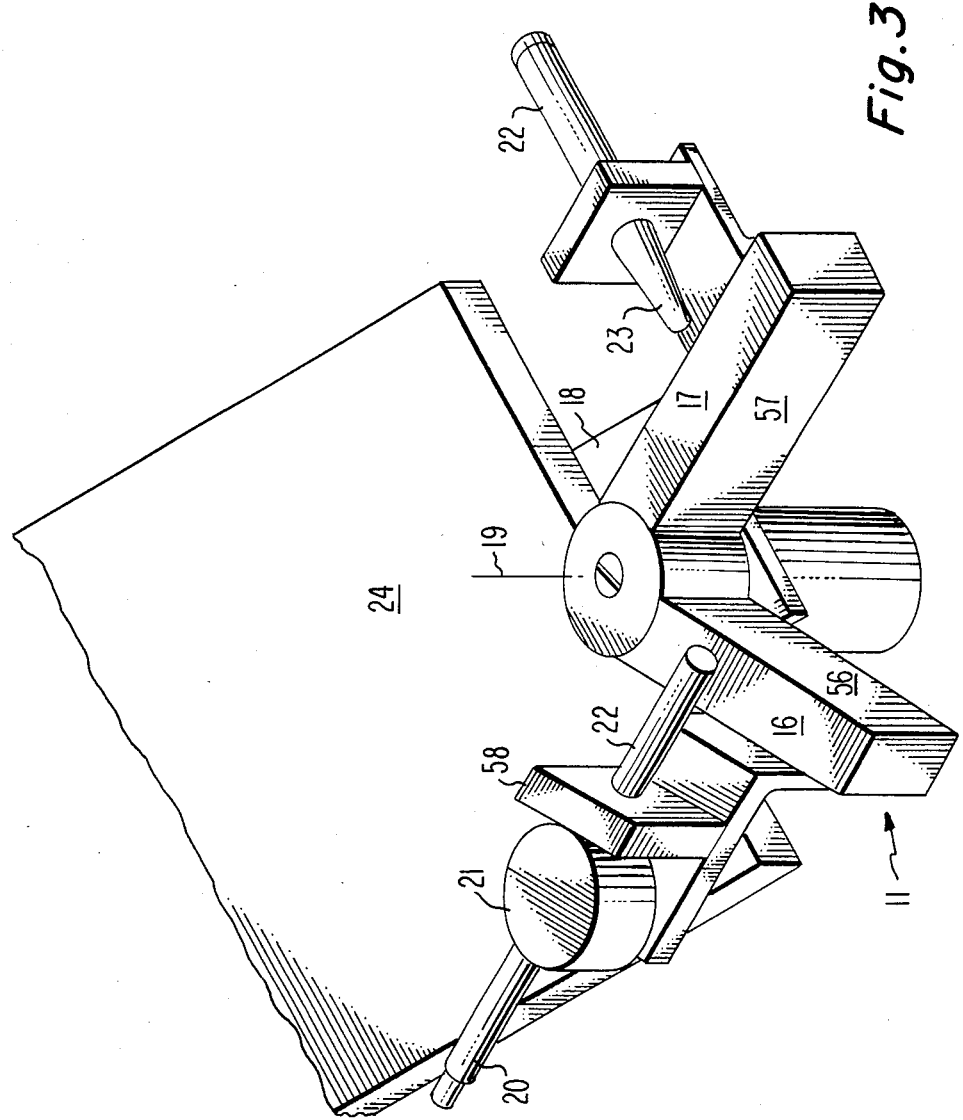

DEVICE FOR MEASURING THE OFFSET BETWEEN THE FACEPLATE PANEL AND FUNNEL OF A KINESCOPE

BACKGROUND OF THE INVENTION

This invention relates generally to the manufacture of kinescopes such as for color television receivers or computer displays and particularly to the measurement of the offset between the faceplate panel and funnel of such a kinescope.

The picture tube, or kinescope, for a color television receiver or computer display is composed of a faceplate panel and a funnel which are fritted together along mating sealing edges. A frit material is placed on the sealing edge of either the panel or the funnel. The panel and funnel are placed together and are put into a carrier which conveys them into an oven. The carrier includes reference members which accurately position the funnel and the panel relative to one another so that the sealing edges of the two elements properly mate along a smooth seal line. The carrier is moved by a conveyor system through the oven and the frit material vitrifies to permanently join the panel and funnel. Typically kinescopes are substantially rectangular with slightly rounder sides. The proper operation of the kinescopes requires accurate alignment of the panel and funnel along the major axis. For this the funnel is provided with a reference pad on the major axis. The position of the panel with respect to the reference pad is thus indicative of whether or not the panel and funnel are properly aligned. Thus, an offset in either direction along the major axis which exceeds a predetermined maximum indicates an unacceptable kinescope. Additionally, because the carrier is used to align the panel and funnel an excessive offset frequently is indicative of a damaged or improperly calibrated carrier. The carrier thus should be repaired or recalibrated to avoid producing additional rejects. For these reasons, there is a need for a device for automatically and accurately measuring the offset between the funnel and panel of a kinescope to verify that the offset does not exceed a predetermined maximum. The instant invention fulfills this need by the provision of a device for measuring such offset and for providing a reject signal which can be used to identify the kinescope as a reject and the carrier as potentially damaged or miscalibrated.

SUMMARY

A device for measuring the offset between a substantially rectangular faceplate panel and a funnel includes a support member configured to engage reference pads on adjacent sides of the funnel. The support member is pivotably mounted on a mounting means to ensure engagement with the reference pads. The mounting means is linearly moveable between a normal extended position and an engaged position when the support member engages the reference pads. As the mounting means moves toward the funnel, the support member engages the reference pads and the mounting means moves from the extended position to an engaged position in accordance with the size of the funnel. A measuring means is supported by the support member to measure the offset between the panel and one of the reference pads and provides a reject signal when the offset exceeds a preselected value.

BRIEF DESCRIPTION OF THE DRAWINGS

FIG. 3 is a perspective view of the measuring head taken along the arrow of FIG. 2.

DETAILED DESCRIPTION

Figure 1:
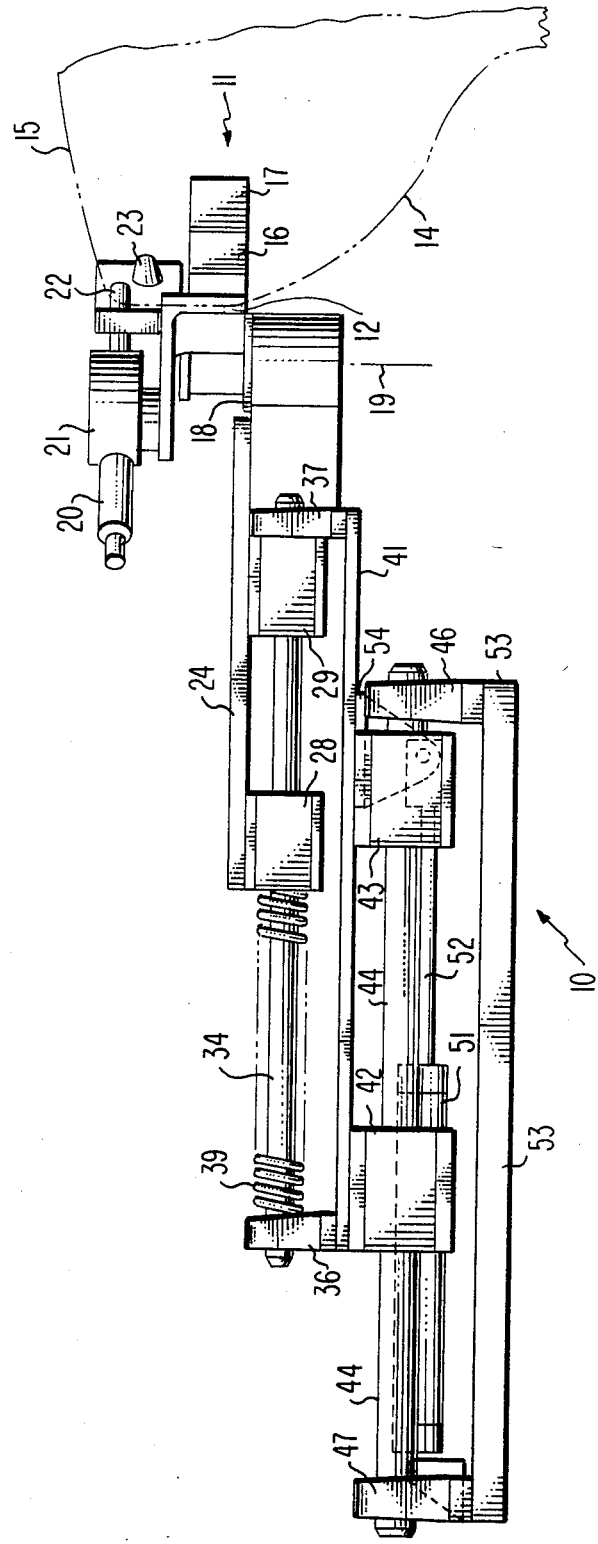
FIG. 1 is a side view of a preferred embodiment.
Figure 2:
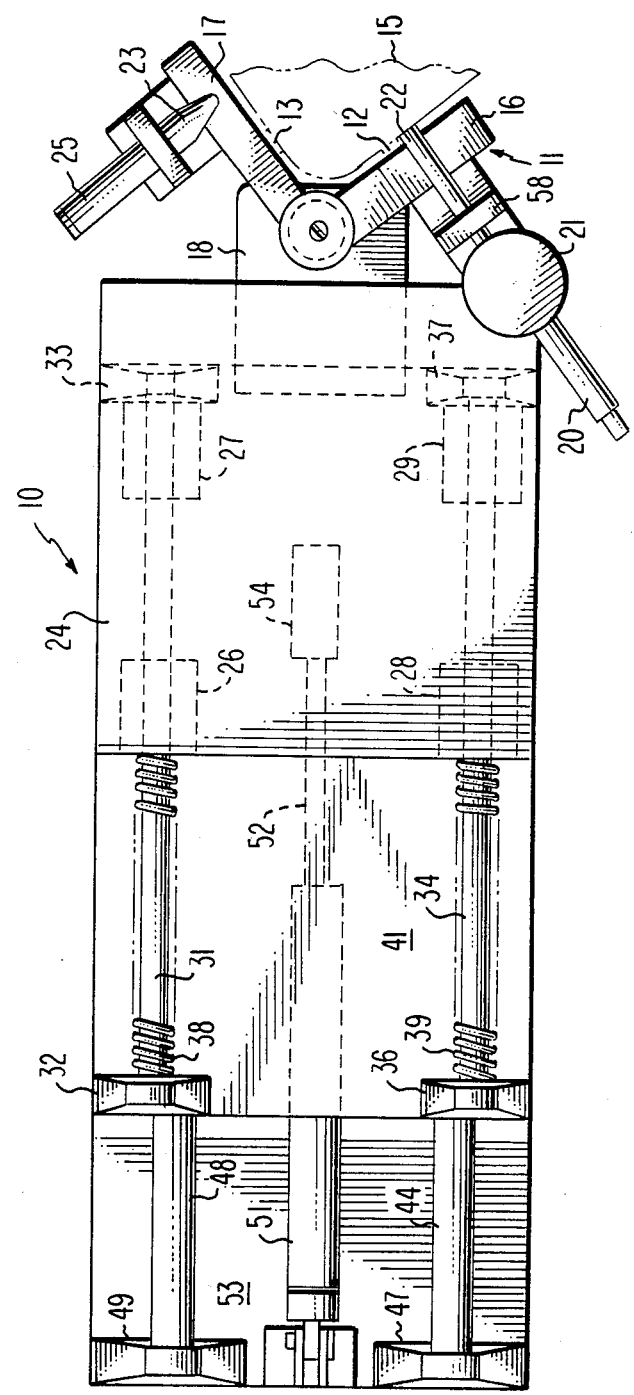
FIG. 2 is a top view of the preferred embodiment shown in FIG. 1.

In FIGS. 1 and 2, an offset measuring device 10 includes a support member 11 configured to engage reference pads 12 and 13 on adjacent sides of a funnel 14, shown in phantom lines. The reference pads 12 and 13 are integral to the funnel 14 and are used to provide a reference position from which the position of a panel 15 is referenced after the panel and funnel are fritted together. The faceplate panels of modern kinescopes are generally rectangular with slightly curved sides. Accordingly, the arms 16 and 17 of the support member 11 are substantially perpendicular. The support member 11 is pivotably coupled to a mounting plate 18 so that the support member 11 is pivotable about a pivot axis 19 which lies at the juncture of the arms 16 and 17.

The arm 16 supports a measuring device 21 having a feeler pin 22. The feeler pin 22 is linearly moveable along the longitudinal axis of the measuring device 21 and is substantially perpendicular to the reference pad 12. The measuring device 21 produces an electrical signal which is proportional to the linear displacement of the pin 22 from a reference, or zero, position. This position can be adjusted using a calibrated screw 20. The measuring device 21 can be a 4082-1E model feeler gage available from Boeckeler Instrument. When the linear motion, irrespective of the direction, of the feeler pin 22 exceeds a preselected maximum, an excessive panel offset exists and the measuring device 21 generates a reject signal to indicate that the envelope is unacceptable. The arm 17 of the support member 11 supports a marking device 25 including a crayon 23 or other marking substance. The marking device 25 responds to the reject signal from the measuring device 21 and the crayon 23 is brought into contact with one side of the kinescope panel 15 to identify the envelope as a reject.

The mounting plate 18 is permanently affixed to a slidable platform 24. The platform 24 is permanently affixed to slide blocks 26, 27, 28 and 29. The ends of a guide rod 31 are affixed to a baseplate 41 by mounting blocks 32 and 33. The guide rod 31 slidably passes through the slide blocks 26 and 27. Similarly, a guide rod 34 is fixed to the baseplate 41 by mounting blocks 36 and 37 and slidably passes through the slide blocks 28 and 29. A spring 38 is arranged on the guide rod 31 and biases the platform 24 outwardly toward the kinescope panel 15. Similarly, a spring 39 is arranged on the guide rod 34 and also biases the platform 24 outwardly toward the kinescope panel 15.

In FIG. 1, the mounting blocks 36 and 37 are permanently affixed to the top of the plate 41. Affixed to the other side of the plate 41 are additional slide blocks 42 and 43 which are arranged in the vicinity of one edge of the plate 41. A guide rod 44 passes through the slide blocks 42 and 43. The ends of the guide rod 44 are permanently fixed to a baseplate 53 by mounting blocks 46 and 47. In FIG. 2, an additional guide rod 48 is arranged in the vicinity of the other edge of the plate 41. One end of the guide rod 48 is supported by a mounting block 49. The other end of the guide rod 48 is also supported on the baseplate 53. The rod 48 passes through additional slide blocks on the bottom of the plate 41, these elements are not shown for simplicity. A fluid cylinder 51 having a shaft 52 is affixed to the baseplate 53 at one end. The shaft 52 is coupled to the bottom of the plate 41 by a bracket 54. The baseplate 53 can be permanently attached to a support structure of convenient configuration and appropriate height.

In operation, the shaft 52 is normally retracted into the cylinder 51. Also, the springs 38 and 39 bias the slidable platform 24 outwardly away from the mounting blocks 32 and 36. The offset measuring device 10 is situated in the vicinity of a location where kinescope envelopes will be positioned. The positioning of the envelopes can be effected using either a conveyor system or an automatic transfer device. However, the envelopes are firmly held by the transfer device during the offset measurement. The device 10 is intended to measure the offset of all sizes of kinescopes and accordingly the distance between the measuring device 10 and the kinescopes can vary substantially in accordance with the size of the envelopes. For example, kinescopes can have a diagonal dimension from 22 to 68 cm. Also, automatic positioning is more readily accomplished when the center of the envelope panels are positioned at substantially the same location irrespective of the envelope size. Accordingly, the distance from the offset measuring device 10 to the preselected envelope location can vary by as much as half of the difference in tube diagonal sizes; i.e. 23 cm. The length of the shaft 52 and the cylinder 51 is chosen to assure that the support member 11 engages all envelopes irrespective of the diagonal dimension. When an envelope is present at the preselected location, the cylinder 51 is actuated and the shaft 52 moves outwardly. The plate 41 is attached to the shaft 52 by the bracket 54 and the slide blocks 42 and 43 slide along the guide rod 44. Thus, the slidable platform 24 and the support member 11 move in unison toward the envelope. The panel 15 is oriented so that the motion of the shaft 52 is substantially parallel to a diagonal of the panel. However, precision is not required because the support member 11 is pivotably mounted on the mounting member 18. Accordingly, as the arms 16 and 17 of the support member 11 engage the reference pads 12 and 13 on the sides of the funnel 14, the support 11 pivots about the pivot axis 19 and the arms 16 and 17 fully engage the reference pads. The shaft 52 of the cylinder 51 is fully extended irrespective of the size of the panel 15. Accordingly, as the arms 16 and 17 of the support member 11 engage the pads, the shaft 52 of the cylinder 51 continues to move outwardly. The slidable platform 24 thus is biased rearwardly and the slide blocks 26, 27, 28 and 29 slide on the guide rods 31 and 34 against the springs 38 and 39 toward the fixed mounting blocks 32 and 36. Accordingly, the slidable platform 24 permits the measurement of the panel to funnel offset for all kinescope sizes and the lengths of the guide rods 31 and 34 are selected to accommodate all tube sizes.

In FIG. 3, the arms 16 and 17 of the support member 11 respectively include flat surfaces 56 and 57 which engage the reference pads 12 and 13 of the funnel 14. The arms 16 and 17 are made of a nonresilient material such as aluminum or acrylic, so that the arms of flat surfaces 56 and 57 do not compress or flex during engagement with the reference pads 12 and 13. The feeler pin 22 of the measuring device 21 is supported by a support 58 to ensure the linear motion of the feeler pin 22 and to prevent the pin from being bent. The feeler pin 22 is arranged at a preselected height above the arm 16 to ensure that the pin 22 engages the side of the panel 15. The measuring device 21 is calibrated so that the offset between the funnel 14 and panel 15 can be measured irrespective of whether the offset is toward or away from the feeler arm 22. Thus, the feeler arm 22 extends beyond the support block 58 by a preselected distance to assure that the side of the panel 15 is engaged irrespective of the offset. The preselected extension of the pin 22 exceeds the reference extension which indicates zero panel-to-funnel offset. Accordingly, when the offset is such that the panel 15 is further from the measuring device 21 than the reference pad 12, the feeler pin 22 nevertheless engages the panel. As the feeler pin 22 is pushed inwardly toward the reference extension, an electrical signal is generated. When the panel-to-funnel offset is sufficient to cause rejection of the tube, the reference extension is never reached and a reject signal is generated. When the offset is such that the side of the panel 15 is closer to the measuring device 21 than the reference pad 12, the feeler pin 22 passes through the reference extension and the measuring device 21 continues to generate an electrical signal. When the offset is beyond the acceptable limit, the electrical signal is utilized as a reject signal. The reject signal is provided to the marking device 25 and the crayon 23 is pushed outwardly against the side of the panel 15 to indicate a reject.

What is claimed is:

1. A device for measuring the offset between a substantially rectangular kinescope faceplate panel and a funnel affixed to said panel comprising:
   a support member configured to engage reference pads on adjacent sides of said funnel;
   mounting means for pivotably holding said support member to ensure engagement of said support member with the funnel reference pads, said mounting means being linearly moveable between a normal extended position and an engaged position when said support member engages the funnel reference pads;
   means for moving said mounting means toward the funnel whereby said support member engages the funnel reference pads and said mounting means moves from said extended position to an engaged position in accordance with the size of the funnel;
   measuring means supported by said support member in fixed relationship thereto for measuring the offset of the panel from one of the funnel reference pads and providing a reject signal when the offset exceeds a preselected value.

2. The device of claim 1 further including marker means supported by said support member, said marker means being responsive to said reject signal for applying a reject mark in response to said reject signal.

3. The device of claim 2 wherein said support member includes two substantially perpendicular arms and a pivot axis substantially perpendicular to said arms in the proximity of the juncture of said arms.

4. The device of claim 3 wherein said mounting means includes a slideable platform resiliently biased to said extended position.

5. The device of claim 4 wherein said platform slides along guide rods and is spring biased into said extended position.

6. The device of claim 5 wherein said means for moving is a fluid cylinder.

7. The device of claim 1 wherein said support member includes two substantially perpendicular arms and a pivot axis substantially perpendicular to said arms in the proximity of the juncture of said arms.

8. The device of claim 7 wherein said mounting means includes a slideable platform resiliently biased to said extended position.

9. The device of claim 8 wherein said platform slides along guide rods and is spring biased into said extended position.

10. The device of claim 8 wherein said means for moving is a fluid cylinder.

* * * * *